United States Patent [19]

Fincher et al.

[11] 3,876,005

[45] Apr. 8, 1975

[54] HIGH TEMPERATURE, LOW DENSITY CEMENTING METHOD

[75] Inventors: Arnold Fincher, Laurel, Miss.; Pat J. Broussard, Shreveport, La.

[73] Assignee: Halliburton Company, Duncan, Okla.

[22] Filed: Mar. 18, 1974

[21] Appl. No.: 452,108

Related U.S. Application Data

[62] Division of Ser. No. 220,439, Jan. 24, 1972, Pat. No. 3,832,196.

[52] U.S. Cl............................... 166/292; 166/293
[51] Int. Cl............................................. E21b 33/14
[58] Field of Search ........ 166/292, 293; 106/97, 89, 106/120

[56] References Cited
UNITED STATES PATENTS

| 1,355,131 | 10/1920 | Dobbins............................ 106/97 X |
| 1,553,105 | 9/1925 | Power................................ 106/97 X |
| 2,987,406 | 6/1961 | Minnick............................... 106/97 |
| 3,340,929 | 9/1967 | Slagle................................. 166/292 |
| 3,363,689 | 1/1968 | Smith et al......................... 166/292 |
| 3,406,756 | 10/1968 | Carter et al................... 166/292 X |
| 3,522,068 | 7/1970 | Bastian............................ 106/97 X |
| 3,557,876 | 1/1971 | Tragesser......................... 166/292 |
| 3,729,052 | 4/1973 | Caldwell....................... 166/292 X |
| 2,803,556 | 8/1957 | Carlsson et al................ 106/120 X |

Primary Examiner—Stephen J. Novosad
Attorney, Agent, or Firm—Fred E. Hook; Thomas R. Weaver; John H. Tregoning

[57] ABSTRACT

A well bore penetrating a subterranean formation is cemented by placing a cementing composition comprising hydraulic cement, pozzolanic material, lime and water in the annulus defined by the conduit disposed in the well bore and maintaining the composition in the annulus until the composition hardens.

7 Claims, No Drawings

HIGH TEMPERATURE, LOW DENSITY CEMENTING METHOD

This is a division of pending application, Ser. No. 220,439 filed Jan. 24, 1972, and now U.S. Pat. No. 3,832,196.

This invention relates to a method of cementing a conduit disposed in a well bore penetrating a subterranean formation with a cementing composition comprising hydraulic cement, lime and a pozzolanic material mixed with water to form a slurry useful in the completion of oil and gas wells.

With the drilling of wells for the production of hydrocarbons to depths exceeding 20,000 feet in recent years, new problems, or intensifications of old problems, have been encountered which have required the development of new types of completion techniques, and new drilling and completion compositions, such as drilling muds and well cementing compositions. In the case of oil and gas well cements, certain requirements and desiderata have been identified as characteristic of deep well completions. In the technology of oil well cements, it is recognized that increased circulation times, high temperatures and high pressures encountered in wells of from 14,000 to 25,000 feet in depth require special cememts having certain characteristics in order to function effectively in these environments of usage. Thus, in ultra deep wells having a depth of 16,000 feet and over, temperatures exceecing 300°F may be reached, and pressures in excess of 15,000 psi may be encountered. Moreover, in these deep wells, the hydrostatic head developed in the column of cement slurry positioned in the annulus between the casing and the surrounding bore hole wall is very large, even when relatively low density or light cements are used. Where high density cements are used, the hydrostatic head developed may easily become sufficiently great for the cement slurry to break through weak surrounding formations with resultant lost returns.

One of the types of cementing compositions which has been developed for the purpose of meeting the requirements of well completions consists of a mixture of substantially equal amounts of pozzolanic material and Portland cement. Pozzolans may be defined as materials which, though not cementitious in themselves, contain constituents which will combine with hydrated lime at ordinary temperatures in the presence of water to form stable compounds possessing cementing properties. The pozzolanic material combines chemically with calcium hydroxide released upon hydration of Portland cement, and due to the relatively lower density of the pozzolans (as compared to cement), a relatively light weight or low density cement is obtained. The viscosity of this resulting composition is also reduced as compared to neat cements, and pumpability is thereby improved. These pozzolan-cement slurries are compatible with many of the usual cement additives, such as retarders and accelerators. The lime sequestering effect of the pozzolan also improves the resistance of the composition to sulfate attack, and improved qualities are generally demonstrated by these slurries after setting.

Another type of cementitious composition which has been developed for use in deep well cementing contains pozzolanic material and hydrated lime. These compositions usually also contain a small amount of calcium chloride which functions as an activator. These compositions function well at high temperatures, are of relatively low density (light weight), and are compatible with many of the conventional cement additives. No retrogression in strength is experienced with the pozzolan-lime compositions where an amount of water is included in the compositions which yields a slurry having a density of at least 14 pounds per gallon. As additional water or a gel material is added in an endeavor to reduce the density of the cement, however, the resulting cement commences to display a retrogression of strength which is intolerable in may well cementing applications. In a sense then, low density and good strength retention properties are incompatible in high temperature cement derived from a mixture of pozzolanic material and lime. The density limitation presents the problem of formation breakthroughs under high hydrostatic heads often developed in deep well cementing operations--the very type of operation where the pozzolan lime composition is most advantageous in respect to its high temperature characteristic.

Another problem which has been encountered with lime-pozzolan cements is their very slow curing rates at relatively low temperatures. As a result of this, an activator such as calcium chloride is frequently added. Its inclusion is generally required even at well temperatures as high as 250°F and where the temperature is less than about 140°F (well depths less than about 6,000 feet), the lime-pozzolan slurry will not set satisfactorily.

Finally, the lime-pozzolan cementing compositions are not compatible with salt, and thus are not well suited for cementing operations in salt formations.

A difficulty experienced with the pozzolan-cement compositions is their propensity to break down and retrogress in strength at the high temperatures encountered in very deep well usage. In general, the mixture does not perform well at well temperatures exceeding about 260°F (depths exceeding about 12,000 feet). Even at temperatures lower than 260°F it is necessary to add substantial amounts of silica flour to avoid unsatisfactory strength retrogression. Another characteristic of a 50:50 mixture of pozzolan and cement is the relatively high viscosity of the mixture when bentonite is added, as it frequently is, as a bulking agent. In such case, in order to attain satisfactory pumpability, it is necessary to incorporate a thinner additive to the cement slurry.

We have now discovered that these and other problems can be overcome by a cementing method wherein a cementing composition comprising hydraulic cement, pozzolanic material, lime and water is placed in the annulus defined by a conduit disposed in a well bore penetrating a subterranean formation and the cementing composition is maintained in the annulus until the cement hardens. These cementing compositions may be described as high temperature, low density cements subject to certain qualifications hereinafter stated. As this terminology is used in the art of well cementing, it is understood to characterize the composition as being stable and useful at relatively high bottom hole temperatures, and as having relatively low density as compared to other well cementing compositions. More specifically, compositions stable and pumpable at temperatures above about 260°F are generally referred to as high temperature cements, and those having a density of from about 12 to about 14.5 pounds per gallon are generally referred to as low density or "light" cements. Other important properties also characterize the cement compositions of the present invention, and are hereinafter described in greater detail.

These cementing compositions contain from about 5 to about 200 parts by weight of a hydraulic cement, from about 5 to about 25 parts by weight lime and about 100 parts by weight of pozzolanic material. Above the maximum amount of cement described, the composition becomes uneconomic to formulate and use, and the thickening time and pumpability suffer substantially. Exceeding the maximum amount of lime described results in the inclusion of excess lime which cannot be chemically combined with the pozzolan in the final set cement. Below the minimum amount of cement described, the catalytic activity of the cement in promoting reaction between the lime and pozzolan becomes suppressed to the point where curing times at lower temperatures are so high that little advantage is realized over pozzolan-lime cements. Preferably, the composition contains from about 40 to about 50 parts by weight of cement, and from about 15 to about 25 parts by weight of lime per 100 parts by weight of pozzolanic material. The most preferred mixture of components is a mixture containing about 42 parts by weight of cement, about 21 parts by weight of lime, and about 100 parts by weight of pozzolanic material.

The hydraulic cement utilized in these cementing compositions is preferably a Portland cement and may be any one of the eight API classes of cement, i.e. A, B, C, D, E, F, G, or H. Class H Portland cement is preferably utilized because of its general utility or all-purpose character, wider availability and relatively more economic acquisition costs than some of the other types of cement.

The pozzolanic material employed can be any of a variety of types of pozzolans, either natural or artificial. Preferably, however, the artificial pozzolan called "fly ash" in the art is utilized in the compositions of the invention because of its fineness and low carbon content. This pozzolan is the combustion product resulting from the burning of pulverized coal in steam generating plants. A typical analysis of a good quality fly ash is as follows:

| Component | Weight Percent |
|---|---|
| Silicon Dioxide | 40.54 |
| Aluminum Oxide | 18.51 |
| Iron Oxide | 23.19 |
| Magnesium Oxide | 1.05 |
| Calcium Oxide | 6.31 |
| Sulfur Trioxide | 1.55 |
| Loss on Ignition | 2.76 |
| Passing 325 Mesh Sieve | 93.8 |

In addition to the three primary components of these cementing compositions as hereinbefore described, the cementing compositions are compatible with, and may include, most other conventional or standard additives employed in oil well cementing compositions such as retarders, salt, low fluid loss additives, weighting materials and accelerators.

In making up these cementing compositions for use in oil and gas well cementing operations, water is added to the dry mixture of pozzolan, cement and lime in varying amounts, depending upon the application or usage confronted, and the properties desired in the slurry utilized. In general, an amount of from about 4 to about 8 gallons of water per sack of cement is employed (or a weight ratio of water to solids of from about 0.4 to about 0.85). It is preferred that from about 7 to 8 gallons of water be utilized with the most preferred dry mixture as hereinbefore described for the reason that this yields a relatively low density slurry (of from about 12.7 pounds per gallon to about 13.5 pounds per gallon), and it is this type of slurry which has greatest utility and advantage in relation to other types of presently available compositions.

These cementing compositions have a number of advantageous properties and characteristics. Although they have been referred to as a high temperature, low density cement, they can be mixed and weighted with suitable weighting materials to make them of relatively high density (up to 17 or 18 pounds per gallon) if this is desired for a particular application (such as matching heavy drilling muds). Densities of at least 15.5 pounds per gallon can be obtained merely by variation in the proportions of the components and the amount of water added. They set up well and have a relatively low waiting on cement (WOC) time at low temperatures, even though no activator or accelerator additive is included in the mixture. These compositions are compatible with saturated salt solution as an additive and thus can be used for cementing casing in salt formations.

These cementing compositions do not suffer strength retrogression at high temperatuures, and this is accomplished without silica flour addition. In the most useful low density compositions (12.7 pounds per gallon to about 14.5 pounds per gallon), the slurries are easily pumpable without the necessity for adding thinners. Additionally, the pozzolanic material in the composition combines with the calcium hydroxide released upon hydration of the cement and in this way renders the set cement more resistant to sulfate attack than is characteristic of cement compositions which do not contain the pozzolanic material.

The following examples are presented in further illustration of the invention, and should not be regarded as limiting the invention in any way. In the examples, the quantities of materials are expressed as parts by weight unless otherwise indicated. The tests carried out are those prescribed in API RP 10B, "Recommended Practice for Testing Oil Well Cements and Cement Additives." The term BHST where used refers to bottom hole static temperature.

EXAMPLE 1

A number of cementing compositions are prepared in accordance with the present invention, using varying amounts of fly ash pozzolan, API Class H Portland cement and hydrated lime. Water is added to the compositions to produce slurries having typical densities suitable for oil well cementing practice. The slurry densities are measured, as are the slurry thickening times, using an API casing-cementing schedule of 8,000 feet (BHST—200°F). In another series of tests, the compressive strength of the several cement compositions is measured at the end of one day and seven days after curing the slurries at 230°F and 3,000 psi. The results which are obtained in these tests are set forth in Tables I and II.

TABLE I

PHYSICAL PROPERTIES

| Fly Ash Parts | Class H Cement Parts | Lime Parts | Water/ Solids Ratio | Slurry Density Lbs/Gal | Thickening Time Hours:Minutes |
|---|---|---|---|---|---|
| 100 | 5 | 5 | — | 14.4 | 8:00+ |
| 100 | 10 | 5 | — | 14.2 | 8:00+ |
| 100 | 25 | 5 | .446 | 14.53 | 6:05 |
| 100 | 25 | 15 | .550 | 14.02 | 6:00+ |
| 100 | 25 | 25 | .646 | 13.67 | 6:00+ |
| 100 | 50 | 5 | .436 | 14.79 | 3:12 |
| 100 | 50 | 15 | .520 | 14.33 | 6:00+ |
| 100 | 50 | 25 | .602 | 13.98 | 6:00+ |
| 100 | 100 | 5 | .443 | 14.98 | 3:04 |
| 100 | 100 | 15 | .486 | 14.74 | 3:12 |
| 100 | 100 | 25 | .548 | 14.42 | 4:15 |
| 100 | 150 | 5 | .413 | 15.40 | 2:29 |
| 100 | 150 | 15 | .465 | 15.03 | 2:37 |
| 100 | 150 | 25 | .517 | 14.71 | 2:50 |
| 100 | 200 | 5 | .412 | 15.52 | 1:15 |
| 100 | 200 | 15 | .450 | 15.23 | 1:57 |
| 100 | 200 | 25 | .492 | 15.05 | 2:06 |

TABLE II

COMPRESSIVE STRENGTH - PSI
CURING TEMPERATURE - 230° 3000 PSI

| Fly Ash Parts | Cement Parts | Lime Parts | Curing Time - Days 1 | 7 |
|---|---|---|---|---|
| 100 | 5 | 5 | 360 | — |
| 100 | 10 | 5 | 1500 | — |
| 100 | 25 | 5 | 3350 | 3700 |
| 100 | 25 | 15 | 2375 | 3060 |
| 100 | 25 | 25 | 2150 | 2700 |
| 100 | 50 | 5 | 3600 | 4675 |
| 100 | 50 | 15 | 2685 | 3535 |
| 100 | 50 | 25 | 2375 | 2860 |
| 100 | 100 | 5 | 3850 | 4310 |
| 100 | 100 | 15 | 3310 | 4025 |
| 100 | 100 | 25 | 2675 | 3010 |
| 100 | 150 | 5 | 4435 | 5375 |
| 100 | 150 | 15 | 3650 | 4665 |
| 100 | 150 | 25 | 3000 | 3360 |
| 100 | 200 | 5 | 5285 | 5550 |
| 100 | 200 | 15 | 3785 | 4835 |
| 100 | 200 | 25 | 3260 | 4160 |

It will be noted that with the increase in the proportion of cement in the mixture, the density of the slurry is increased when about the same amount of water is used. Moreover, the thickening time is markedly reduced and approaches an unacceptably short thickening time (about 1½ hours) in the slurries which contain cement and pozzolan in a 2:1 weight ratio, and are characterized by a water to solids ratio of from about 0.41 to about 0.49. As the amount of cement in the mixture is increased, the cost of the composition increases rapidly due to the relatively higher cost of cement as compared to pozzolan, and the fact that the bulk volume of the cement is decreased substantially—that is, each sack of the cement slurry as thus constituted occupies a lesser volume and thus significantly more cement is required to accomplish a given cementing job. When the amount of cement in the mixture is decreased to below about 5 parts per 100 parts of pozzolan and 5 parts of lime, the time required to set to an acceptable compression strength is excessive.

EXAMPLE 2

A light weight cementing composition is made up and contains 23.5 weight parts of API Class H cement, 55.5 weight parts of a fly ash pozzolan and 11.8 weight parts of lime. The fly ash pozzolan has the following composition:

| Component | Weight Percent |
|---|---|
| Silicon dioxide | 43.20 |
| Iron and aluminum oxides | 42.96 |
| Calcium oxide | 5.92 |
| Magnesium oxide | 1.03 |
| Sulfur trioxide | 1.70 |
| Carbon dioxide | 0.03 |
| Loss on ignition | 2.98 |
| Undetermined | 2.21 |

A cement slurry is made up by adding water to the dry components of the mixture in an amount of 7.8 gallons per sack of cement. The density of the slurry thus produced is 12.9 pounds per gallon, and the yield of the slurry is 1.61 cubic feet per sack. To several different batches of the cement composition, two commercially available retarders are added in varying amounts. Thickening time and compressive strength tests are carried out under simulated well cementing conditions and the results are reported in Tables III and IV. The tabulated results show that adequate thickening times are obtained, even under deep, hot well conditions, and that no retrogression in compressive strength is encountered over 7 days curing time.

TABLE III

PRESSURE-TEMPERATURE THICKENING-TIME TESTS
API Cementing Schedules

| Depth Feet | Temperature—°F Static | Circulating | Retarder A[2], Weight Percent | Retarder B[3] Weight Percent | Thickening Time-Hours: Minutes |
|---|---|---|---|---|---|
| | | Casing-Cementing Schedules | | | |
| 10,000 | 230 | 144(36)[1] | 0.0 | 0.0 | 5:00+ |
| 12,000 | 260 | 172(44) | 0.0 | 0.0 | 5:00+ |
| 14,000 | 290 | 206(52) | 0.4 | 0.0 | 3:30 |
| 16,000 | 320 | 248(60) | 0.5 | 0.0 | 1:50 |
| 16,000 | 320 | 248(60) | 0.0 | 0.8 | 4:37 |

TABLE III—Continued

PRESSURE-TEMPERATURE THICKENING-TIME TESTS
API Cementing Schedules

| Depth Feet | Temperature—°F Static | Circu- lating | Retarder A[2], Weight Percent | Retarder B[3] Weight Percent | Thickening Time-Hours; Minutes |
|---|---|---|---|---|---|
| | | Liner-Cementing Schedules | | | |
| 10,000 | 230 | 144(19)[1] | 0.0 | 0.0 | 5:00+ |
| 12,000 | 260 | 172(24) | 0.0 | 0.0 | 5:10 |
| 14,000 | 290 | 206(29) | 0.0 | 0.5 | 4:08 |
| 16,000 | 320 | 248(34) | 0.0 | 0.8 | 4:16 |

[1]Value in parenthesis is time in minutes to reach BHST.
[2]A commercially available calcium lignosulfonate retarder.
[3]A commercially available retarder which includes lignin and a simple sugar.

TABLE IV

COMPRESSIVE STRENGTH — PSI

| Curing Time | Curing Temperature | | | | |
|---|---|---|---|---|---|
| | 230°F | 260°F | 290°F | 320°F | 350°F |
| Days | 3000 psi | 3000 psi | 3000 psi | 3000 psi | 3000 psi |
| 1 | 1330 | 1555 | 1200 | 1530 | 1715 |
| 3 | 1850 | 1445 | 1835 | 1960 | 2245 |
| 7 | 2075 | 1830 | 2800 | 2810 | 2955 |

EXAMPLE 3

A high temperature, low density cementing composition is prepared which contains 23.5 parts by weight of Class H Portland cement, 55.5 parts by weight of fly ash pozzolanic material and 11.8 parts by weight of lime. To this composition is added 0.2 weight percent of a commercially available calcium lignosulfonate retarder. The dry mixture is slurried by the addition of 7.8 gallons of water per sack of cement to yield a composition having a density of 12.9 pounds per gallon. In a modified API casing-cementing schedule of 15,500 feet (BHST — 250°F), the slurry has a thickening time of five hours. The cement has a compressive strength of 1,200 psi when cured for 24 hours at a temperature of 180°F and at 2,000 psi and 100 percent humidity. When the slurry is cured for the same period, at 2,000 psi and 100 percent humidity at a temperature of 210°F, the compressive strength of the cured cement is 1,800 psi.

EXAMPLE 4

To the cementing composition described in Example 3 is added 18 weight percent NaCl. Water is added to the composition in an amount equivalent to 7.8 gallons of water per sack of the cement to yield a slurry having a density of 13.2 pounds per gallon and a slurry volume of 1.68 cubic feet per sack. This composition is tested and found to have a thickening time of 3 hours and 30 minutes at an API casing-cementing schedule of 16,000 feet (BHST — 260°F). Its compressive strength, after curing for 24 hours at 1,000 psi and 100 percent humidity, is 475 psi at a temperature of 150°F, and 1,650 psi at 200°F.

EXAMPLE 5

To a mixture of cement, pozzolan and lime in the proportions described in Example 3 is added 18 weight percent salt and 0.2 weight percent of a commercially available retarder containing a lignosulfonate compound and a gluconolactone simple sugar (this retarder is described in U.S. Pat. No. 3,053,673). Water is added to the composition in an amount equivalent to 7.8 gallons per sack of cement to yield a slurry having a density of 13.2 pounds per gallon and occupying 1.68 cubic feet per sack. The API pressure-temperature thickening-time test is carried out on the slurry on an API casing-cementing schedule of 16,000 feet (BHST — 320°F). A thickening time of 3 hours and 34 minutes is observed. A test of the compressive strength of the cured slurry is carried out after curing the slurry for a period of 24 hours at 3,000 psi and 100 percent humidity. The measured compressive strength at a temperature of 240°F is 1,650 psi.

EXAMPLE 6

To a mixture of cement, pozzolan and lime prepared in the proportions described in Example 3 are added the equivalent of 22.3 parts by weight of salt per sack of cement in slurry form. Water is added to the thus formed mixture in an amount of 7.8 gallons of water per sack. The density of the slurry thus prepared is 13.4 pounds per gallon, and it occupies 1.75 cubic feet per sack. The thickening time of this slurry, when measured after subjecting the slurry to an API casing-cementing schedule of 16,000 feet (BHST — 320°F), is 3 hours and 34 minutes. After curing the slurry at 200°F, 3,000 psi and 100 percent humidity for a period of 24 hours, its compressive strength is determined to be 1,800 psi.

EXAMPLE 7

The mixture of cement, pozzolan and lime described in Example 3 is made up as a neat cement slurry (no additives are incorporated) by adding 7.8 gallons of water per sack of cement to the dry components. The slurry thus produced has a density of 12.9 pounds per gallon and occupies 1.61 cubic feet per sack. At an API casing-cementing schedule of 12,000 feet (BHST — 260°F), the slurry has a thickening time of slightly more than 3 hours. Compressive strength tests are carried out at several intervals during a period of curing extending through 48 hours, and at several different temperatures. The curing pressure in each case was 1,000 psi. The compressive strengths obtained in these tests are tabulated in Table V.

TABLE V

COMPRESSIVE STRENGTH — PSI

| Time, Hours | Temperature, °F | | |
|---|---|---|---|
| | 140 | 190 | 250 |
| 10 | — | 375 | 1875 |
| 24 | 180 | 1700 | 3050 |
| 48 | 290 | — | — |

EXAMPLE 8

A cement slurry is made by adding 7.8 gallons of water per sack to the mixture of cement, pozzolan and lime described in Example 3, after incorporating 0.5 weight percent of a commercially available, low water loss additive in the dry mixture. The slurry weight is 12.9 pounds per gallon, and the slurry volume is 1.61 cubic feet per sack. The thickening time when determined using a 16,000 foot API casing-cementing schedule (BHST — 320°F) is slightly more than 4 hours. In a fluid loss test conducted in accordance with standard API testing procedure, a fluid loss of 294 cc occurs when the test is carried out at 1,000 psi on 325 mesh screen for a period of 30 minutes. The compressive strength of this cement after curing at 200°F, 1,000 psi and 100 percent humidity for a period of 24 hours is 2,400 psi.

EXAMPLE 9

The same cement slurry as that described in Example 8 is prepared, except for the containment in the slurry of 0.8 percent commercially available water loss additive. This slurry is then subjected to testing, using an 18,000 foot API casing-cementing schedule (BHST — 350°F). The thickening time is 3 hours 30 minutes, and the cement composition exhibits a compressive strength of 2,250 psi when curred at 250°F, 1,000 psi and 100 percent humidity for a period of 24 hours.

EXAMPLE 10

To a mixture of cement, pozzolan and lime made up as described in Example 2 are added 22.3 pounds of salt per sack of the cement composition. 7.8 gallons of water are added per sack of the cement to yield a slurry having a weight of 13.4 pounds per gallon. The slurry volume is 1.75 cubic feet per sack. This composition is then subjected to testing under simulated liner cementing conditions as set forth in API RP 10B schedules for simulating conditions at a well depth of 15,500 feet and bottom hole static temperature of 290°F. The thickening time as determined by pressure-temperature thickening-time tester is 3 hours and 5 minutes.

A composition identical to that described in the preceding paragraph, except for the inclusion of 0.2 weight percent of a commercially available retarder, is prepared and is subjected to testing identical to that described in the preceding paragraph. The thickening time observed is 4 hours and 43 minutes. This cement composition is also tested for compressive strength after curing at 250°F, 3,000 psi and 100 percent humidity for a period of 24 hours. The thus cured composition has a compressive strength of 1,875 psi.

EXAMPLE 11

Casing is cemented in a 15,408 feet deep well in Simpson County, Mississippi. The well extends through a relatively weak formation, presenting some concern for breakthrough in the event of usage of a relatively dense mud and/or cement.

A multiple stage cementing job is performed. In the cementing operation, a differential valve tool (DV tool) is run into a 7-inch casing and set at a depth of 11,600 feet. Cementing of the bottom stage between 15,408 feet and 11,600 feet is then commenced by circulating the cement composition of the invention down the casing and up into the annulus between the casing and the wall of the 8¾ inch well bore. The composition employed contains 23.5 pounds per sack of Class H cement, 55.5 pounds per sack of fly ash, and 11.8 pounds per sack of lime. The slurry contains 7.8 gallons of water per sack, has a density of 12.9 pounds per gallon and each sack occupies a volume of 1.61 cubic feet. The composition is retarded with 0.4 weight percent of carboxymethylhydroxyethylcellulose. At the temperature and pressure conditions in the well over the interval to be cemented in the first stage, the composition has a thickening time of slightly more than 5 hours, and requires 56 minutes to reach the final bottom hole circulating temperature of 216°F. The bottom hole pressure is 14,100 psi. In compressive strength tests, the cement is found to have a compressive strength of 1,825 psi after curing for 24 hours at 235°F, 3,000 psi and 100 percent humidity.

Eight hundred fifty sacks of the described composition are pumped into the well annulus at the lower, first stage interval, and the composition is tailed in by following it with 240 sacks of Class H cement containing 0.5 weight percent of a high temperature retarder, 18 weight percent salt, and 35 weight percent silica flour. This tail in cement is slurried with 6.1 gallons of water per sack. The density of the slurry is 16.1 pounds per gallon and its volumetric displacement is 1.54 cubic feet per sack. The thickening time required is slightly more than 5 hours, and its compressive strength after curing for 24 hours at 300°F, 3,000 psi pressure and 100 percent humidity is 6,000 psi.

After completion of the cementing of the bottom or lower interval, the lower ports of the DV tool are closed and the upper ports are opened. Mud is pumped into the casing to check circulation. Cementing of the upper interval (above 11,600 feet) is then commenced by pumping the cement composition of the invention into the annulus, which at this point is defined by a 9-inch diameter well bore. The composition is identical to that used as filler in the lower interval, except that no retarder is included. 1,450 sacks of the high temperature, low density cement are used. The thickening time of the neat cement composition under well conditions is slightly over three hours and thirty minutes. In compressive strength tests, the cement has a compressive strength of 1,425 psi when cured for 24 hours at 170°F, 2,000 psi and 100 percent humidity.

The high temperature, low density cement is tailed in by 300 sacks of API Class H cement slurry containing 18 weight percent salt, 0.3 weight percent moderate temperature retarder, and 0.75 weight percent of a dispersant additive to reduce the flow rate required to achieve turbulent flow. The tail in cement composition slurry includes 5.2 gallons of water per sack of the dry mix, and the slurry has a density of 15.9 pounds per gallon and a volumetric displacement of 1.21 cubic feet per sack. The thickening time of the slurry is slightly over 3 hours and 30 minutes, and its compressive strength after curing for 24 hours at 300°F, 3,000 psi pressure and 100 percent humidity is 4,350 psi.

Although certain preferred embodiments of the invention have been herein described in order to clearly demonstrate the basic principles of the invention, various changes and modifications may be effected in the specifically identified components and proportions of components set forth in the examples and description as typically characteristic of the compositions of the invention without departure from such basic principles. Changes and innovations of this type are therefore deemed to be within the spirit and scope of the invention except as such spirit and scope may be necessarily limited by the appended claims or reasonable equivalents thereof.

What is claimed is:

1. A method of cementing a conduit disposed in a well bore penetrating a subterranean formation which comprises the steps of:
   a. placing a cementing composition in the annulus defined by the conduit disposed in the well bore; and
   b. maintaining said composition in said annulus until said cementing composition hardens;
wherein said cementing composition comprises a mixture of about 40 to about 50 parts by weight hydraulic cement, about 15 to about 25 parts by weight lime, about 100 parts by weight pozzolanic material, and at least sufficient water to form a slurry.

2. The method of cementing a conduit disposed in a well bore as defined in claim 1 wherein said cementing composition comprises sufficient water to form a slurry having a density of about 12 to about 14.5 pounds per gallon.

3. The method of cementing a conduit disposed in a well bore as defined by claim 1 wherein said cementing composition comprises sufficient water to form a slurry having a density of about 12.7 to about 13.5 pounds per gallon.

4. The method of cementing a conduit disposed in a well bore as defined in claim 1 wherein said hydraulic cement is Portland cement.

5. The method of cementing a conduit disposed in a well bore as defined in claim 4 wherein said hydraulic cement is Portland cement selected from the group consisting of API Class A, B, C, D, E, F, G, and H cement and mixtures of these classes of cement.

6. The method of cementing a conduit disposed in a well bore as defined in claim 1 wherein said pozzolanic material is fly ash.

7. The method of cementing a conduit disposed in a well bore as defined in claim 1 wherein said cementing composition comprises a mixture of about 42 parts by weight Portland cement, about 21 parts by weight lime, about 100 parts by weight fly ash and sufficient water to form a slurry having a density of about 12 to about 14.5 pounds per gallon.

* * * * *